United States Patent [19]

Swinney et al.

[11] Patent Number: 4,673,498

[45] Date of Patent: Jun. 16, 1987

[54] AUTOMATIC BACKWASHING FILTER

[75] Inventors: Denis P. Swinney; Norman Twizell, both of Morpeth; Charles W. Fergusson, Monkseaton, all of United Kingdom

[73] Assignee: Swinney Engineering Limited, Northumberland, United Kingdom

[21] Appl. No.: 782,979

[22] Filed: Oct. 2, 1985

[30] Foreign Application Priority Data

Oct. 4, 1984 [GB] United Kingdom ................ 8425068

[51] Int. Cl.⁴ ...................... B01D 23/24; B01D 27/12
[52] U.S. Cl. .................................. 210/275; 210/333.1
[58] Field of Search ............... 210/263, 264, 269, 274, 210/276, 275, 333.01, 333.1, 277, 108

[56] References Cited

U.S. PATENT DOCUMENTS 4,082,664  4/1978  Lindstol ........................ 210/333.1
4,430,220  2/1984  Litzenburger ................. 210/333.1

Primary Examiner—Frank Sever
Attorney, Agent, or Firm—Brown, Martin, Haller & Meador

[57] ABSTRACT

A filter has a hollow tube (5) which supports exteriorly of the tube (95) a plurality of filter compartments (11). The filter compartments (11) comprise particulate filter media (12) confined between first and second screens (14, 13). Disposed within the tube (5) is a rotatable backwash pipe 8 having backwash ducts (9) which align in turn with holes (7) in the tube (5) leading to the compartments to permit backwashing of the compartments (11). In the preferred arrangement secondary backwash flow is provided between the first and second screens (14, 13).

9 Claims, 9 Drawing Figures

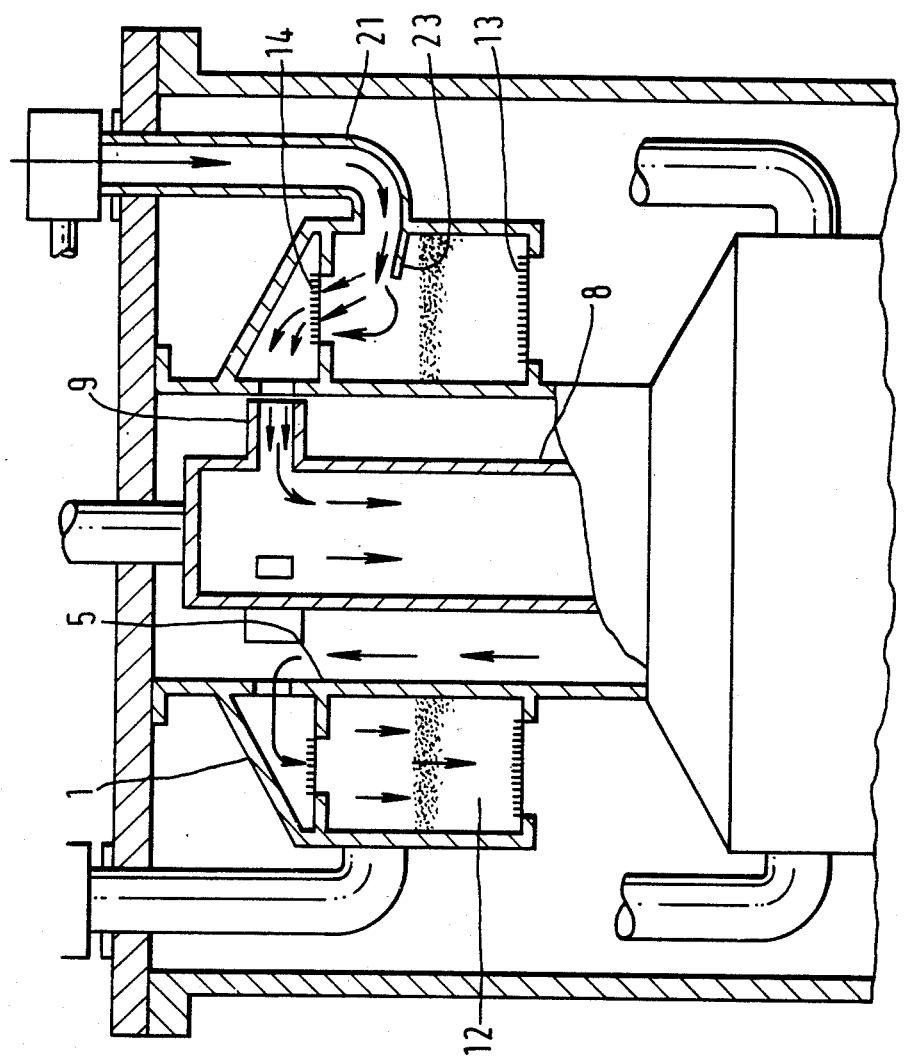

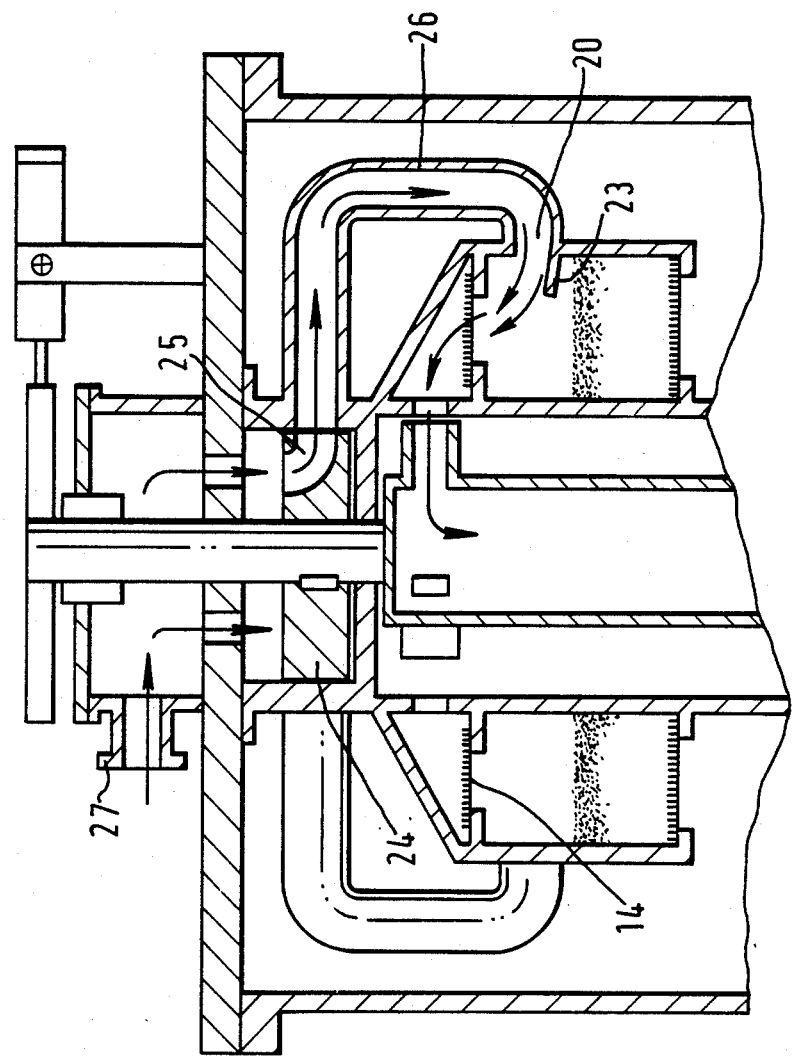

AUTOMATIC BACKWASHING FILTER

This invention relates to an automatic backwashing filter.

The method of backwashing filter elements by reverse flow through a centrally located rotating duct pipe is known. For example such filters are known from our prior U.K. Patent Specification Nos. 1091933 and 2067087. Such filters use filter elements of wire mesh, felt or other closely woven material and may be in plate or cylindrical form.

However, we now propose an automatic filter which provides much finer filtration than can be attained with wire mesh or surface filtration screens for example providing a cut-off of approximately 5 microns or finer.

Depth filtration provided by felt or woven material gives an adequate cut off but the dirt is collected in the depth of the filter element and cannot be totally removed by backwashing so that a deterioration of the filter gradually occurs.

It is an object of the present invention to provide very fine filtration and a means of backwashing which does not result in any appreciable deterioration so that the filter can operate indefinitely without any attention. It may also provide pre-filtration which, at present, requires an automatically backwashing filter to be placed before a fine filter to remove larger sized contamination. Such a filter can be made which is very much lighter in weight than any available apparatus which can achieve the same results, and as it can also act as a pre-filter a further saving in weight can be made by dispensing with the pre-filter.

According to the present invention there is provided a filter comprising a hollow supporting member, a plurality of compartments supported exteriorly of the supporting member and including particulate filter media, rotatable backwash means disposed axially of the supporting member and having at least one duct arranged to register with apertures in the supporting member leading to the filter compartments, and means for bringing the duct into registration with the apertures to permit backwashing thereof.

Preferably we propose to use fine sand or other particulate material as a filter media which is contained in a series of segmented filter beds disposed around a central supporting tube one above the other, each bed communciating with the tube for normal flow and with a rotating backwash duct pipe for reverse flow backwash.

In the preferred embodiment the segmented filter compartments have a top and bottom membrane of suitable aperture to retain the fine media in the compartments. The top membrane above the media bed acts as a pre-filter for larger sized contamination, this top membrane also prevents removal of the filter media during backwashing and is itself backwashed to waste at the same time as the media bed by the reverse flow caused by the opening of a backwash valve situated in the backwash means.

In the preferred arrangement there is also provided means for providing an additional flow of clean water between the particulate material and the first screen or membrane to provide improved backwashing for the first screen without disturbing the particulate material. Preferably, the secondary backwashing flow is provided from an external source controlled in synchronism with the backwash means.

The automatic backwash filter of the present invention is very much lighter than any known apparatus both because of the method of containing and cleaning the media bed and also because it gives pre-filtration saving the need to provide a separate coarse pre-filter before a fine filter.

The invention will now be described by way of example with reference to the accompanying drawings in which:

FIG. 6 is a view similar to that in FIG. 2 but in a second mode;

FIG. 8 is a partial side view of a further alternative arrangement;

Figure 1:
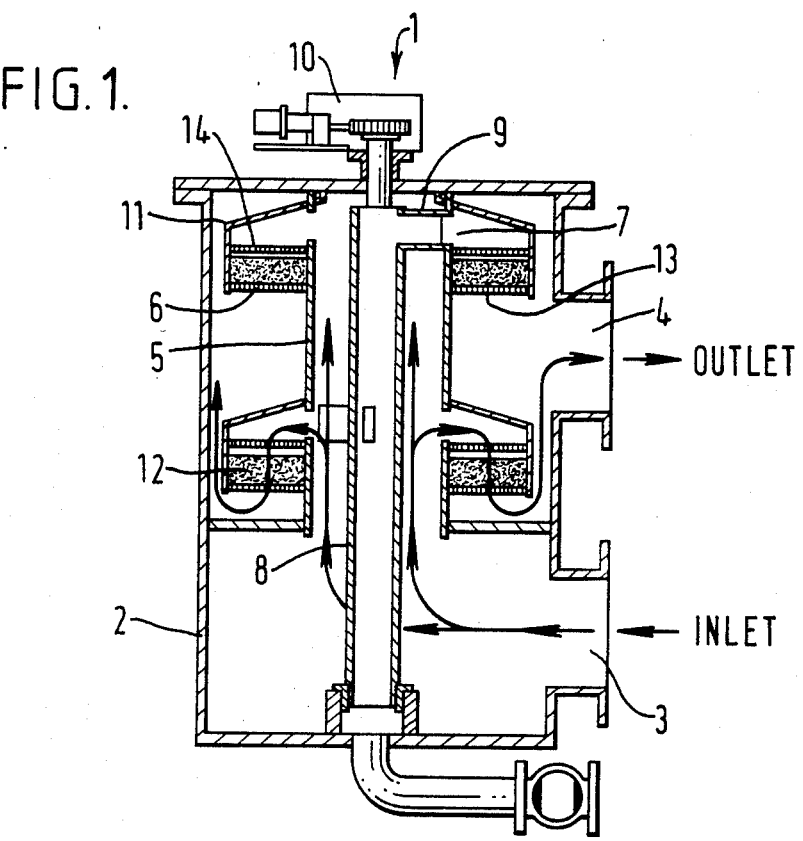
FIG. 1 is a diagrammatic side elevation in section of a first embodiment of filter in accordance with the invention.
Figure 2:
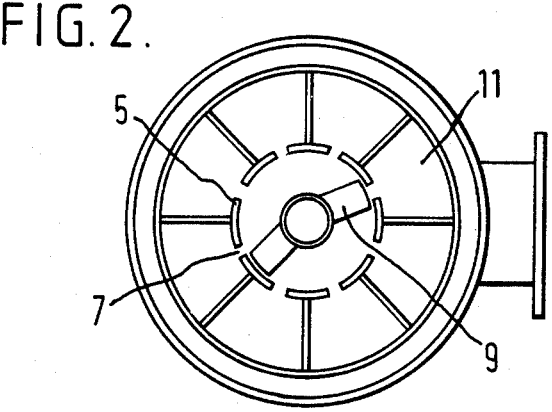
FIG. 2 is a plan view of FIG. 1.

In the first embodiment of the drawings an automatic filter 1 has a shell 2, an inlet 3 and an outlet 4. Disposed within the shell is a support tube 5 which supports two axially displaced filter media beds 6 through which contaminated liquid flows by way of holes 7 in the support tube 5. Axially of the support tube 5 is a backwash pipe 8 having backwash ducts 9 which align in turn with each of the holes 7 when the backwash pipe is caused to rotate by means of a drive unit 10.

Figure 4:
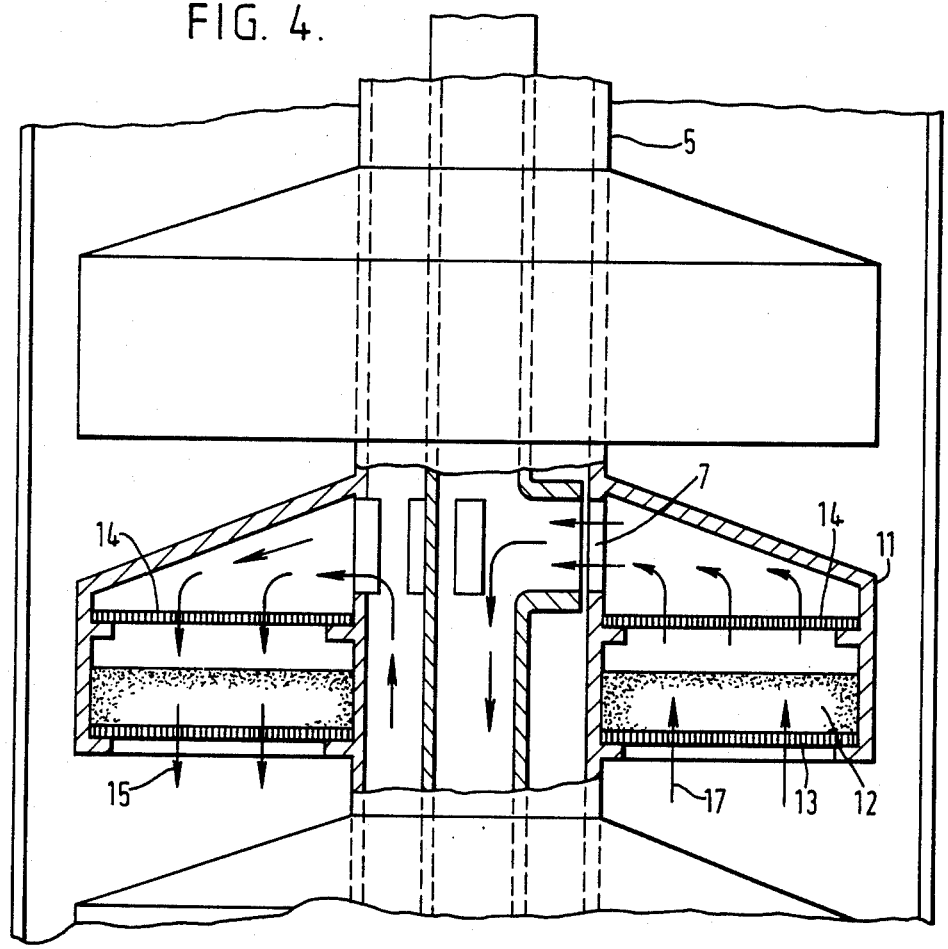
FIG. 4 is an enlarged detailed view of two filter sections.

The media beds 6 are segmented into a number of separate compartments 11, each compartment 11 containing particulate filter media 12 and communicating with one respective hole 7 in the support tube 5. As seen from FIG. 4 the filter media in each compartment 11 lies on a membrane or screen 13 of fine wire mesh or welded wire material suitably supported, which has an aperture size less than the particulate material 12. Positioned above the filter media 12 is an upper pre-filter membrane or screen 14.

In operation contaminated liquid enters the filter 1 through the inlet 3 and flows up the support tube 5, through the holes 7 and the filter beds 6 to the outlet 4 for clean fluid: the arrows in FIG. 1 show the direction of the normal flow which is downwards through the media bed. As seen particularly from FIG. 4, in normal flow, the incoming contaminated liquid must first pass through the upper membranes 14 and this acts as a pre-filter which retains the larger sized contamination. Then the incoming liquid flows downwards through the media bed as indicated by arrow 15.

Figure 3:
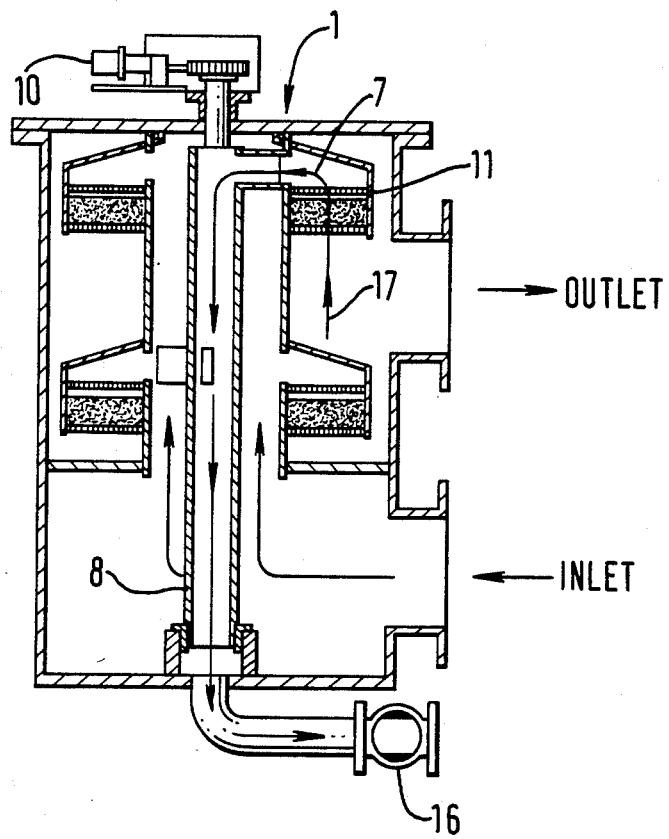
FIG. 3 is a side elevation in section illustrating backwashing.

In FIG. 3 the filter 1 is shown with one or more media compartments 11 being backwashed while normal flow continues in the remainder. In this figure the backwash duct pipe 8 is rotated by the drive unit. The backwash valve at 16 is opened when the media compartments 11 are to be backwashed and the backwash duct pipe 8 is moved progressively into position opposite the holes 7 in the support tube by being driven through the correct angular displacement by the drive unit 10 the backwash pipe rotation then stops for a suitable dwell period while the media in the compartment is backwashed before moving to the next compartment. On the backwash the flow is reversed as shown by arrows 17 in FIGS. 3 and 4 and the contamination is washed out of the media and conveyed into the backwash pipe 8 and so to waste. The particulate media is prevented from escaping by the top membrane 14 during backwash.

Figure 5:
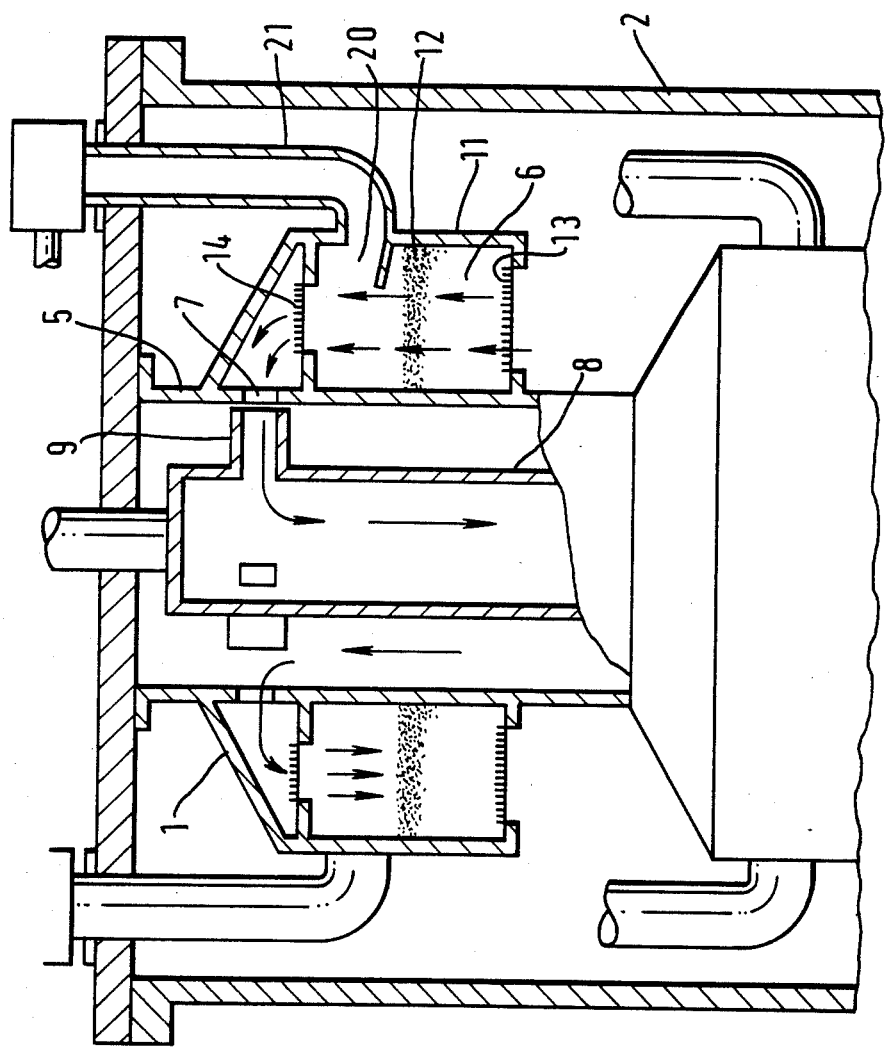
FIG. 5 is a diagrammatic partial side elevation in section of a second preferred, embodiment of filter in accordance with the invention in a first mode.
Figure 7:
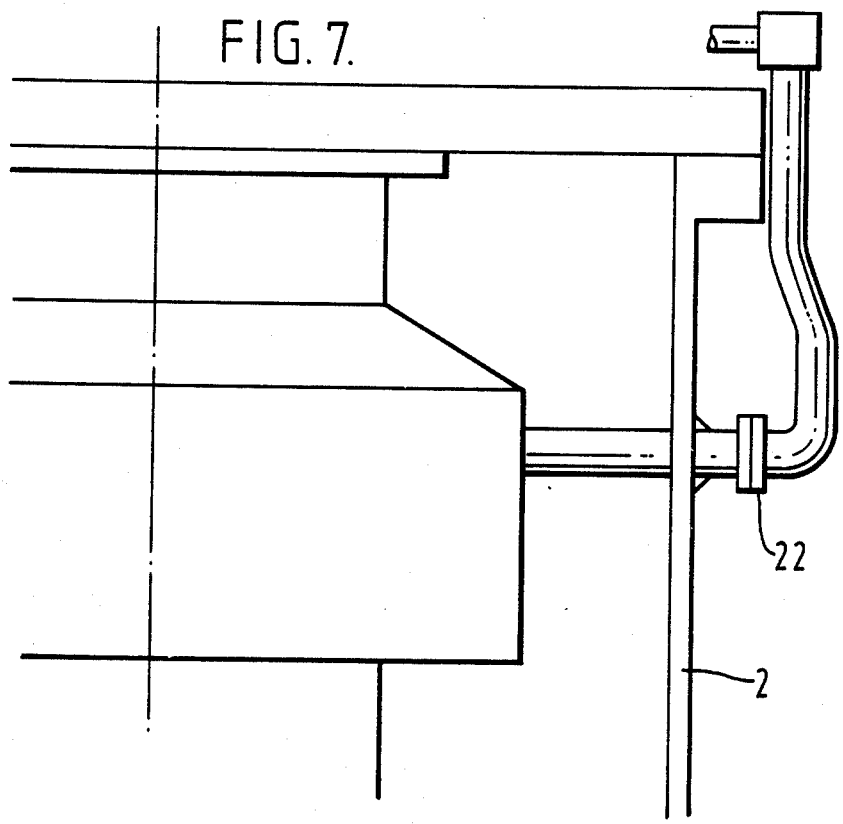
FIG. 7 is a side elevation of the outside of the filter showing an alternative arrangement for the embodiment of FIGS. 5 and 6.

In the embodiments of FIGS. 5 to 7 of the drawings, in which the references used in describing the first embodiment have been used for corresponding parts, a single media bed 6 is shown segmented into a number of separate compartments 11. Filtration is by downward flow through the filter media and backwashing is by reverse flow upwards through the media and out of the filter via the rotating backwash pipe 8. The media is contained by means of the upper screen or membrane 14. Under normal flow this screen 14 may become partially blocked by dirt on the top and it is not always possible to clear this by backwashing through the media as the upward flow rate has to be restricted to avoid undue disturbance of the media.

In order to overcome this possible problem an additional backwashing liquid entry 20 is provided into the space between the top of the media bed and the screen 14. This second entry enables a clean liquid to be pumped at higher pressure than the liquid in the filter body without disturbing the filter media. This liquid is conducted into the media compartments by means of passages or pipes 21 or by pipes 23 from the ouside as in FIG. 7 or by ducts or any other convenient method. This liquid moves upwards directed by a deflector 23. Moreover, to ensure the effective backwash the screen 14 may be restricted as shown rather than extending completely across as shown in the first embodiment.

Figure 9:
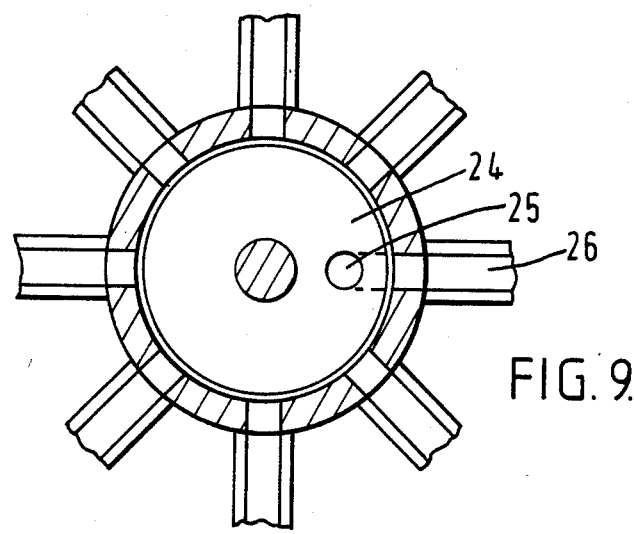
FIG. 9 is a plan view of a distribution discussed in the arrangement of FIG. 8.

FIGS. 8 and 9 show a design for directing pumped backwash liquid to the correct media compartment 11 or compartments via the second entry 20. In this arrangement a distribution disc 24 is secured to the backwash pipe 8 such that rotation of the backwash pipe 8 to backwash the media in the container also brings aperture 25 in the distribution disc 24 opposite a pipe such as 26 leading to the second entry 20 to a compartment 11. In the second backwashing mode a pumped clean liquid enters at 27 and passes via the aperture 25 into the pipe 26 only, the other pipe entries being blocked by the disc 24.

In operation of the embodiment of FIGS. 8 and 9 filtration is as described above but, when backwashing is required, the following sequence is initiated.

1. The backwash pipe 8 is rotated so that the duct 9 aligns correctly with an aperture 7 in the support tube 5 in communication with a media compartment 11.
2. A backwash valve (not shown) opens venting the central backwash pipe 8 to drain.
3. The distribution disc 24 puts the pumped backwash supply in communication with the pipe 26 to the media compartment or compartments to be backwashed.
4. A secondary backwash pump is started and for a short period provides a vigorous reverse flow through the screen 14.
5. After a short period of flow the backwash pump stops and normal backwashing is established by upward flow through the media and out by the backwashing duct pipe in accordance with the first mode disclosed in detail in the figures of the first embodiment.
6. After a suitable period the duct is rotated again and this sequence is repeated for the next media compartment until the whole filter bed is cleaned.

This sequence describes the automatic cleaning of one media compartment but it will be understood that in a large filter which may have 24 or more compartments, more than one compartment at a time may be backwashed. Moreover, more than one filter bed may be provided axially at the support tube 5.

By way of example we propose in one application to provide particulate material of 100 to 300 micron size held between membranes of welded wire with a gap of 80 microns. The prefiltration being 80 microns cut off through the top membrane and 5 microns cut off or finer in the final filtration in the media bed.

It will be understood that there may be any number of tiers of media containing compartments one above the other and that there may be any number of compartments in each tier.

In some cases, where prefiltration is externally provided, the upper retaining mesh or wire membrane above the media bed will serve only to retain the media and not to act as a prefilter.

We claim:

1. A filter comprising a supporting member, a plurality of filter compartments supported by the supporting member for providing very fine filtration of fluid flowing through the filter means, each filter compartment having a first, top membrane and a second, bottom membrane, and fine particulate filter media retained in the compartment between the top and bottom membranes, the top and bottom membranes being of suitable aperture to retain the fine filter media in the compartment, the supporting member having apertures leading to the filter compartments, and backwash means cooperable with the supporting member and having at least one duct arranged to register with the apertures in the supporting member leading to the filter compartments, and means for causing the duct to register with respective apertures to permit backwashing thereof, the top membrane of each compartment comprising means for restricting deterioration of the filter media during backwashing.

2. A filter according to claim 1 wherein the compartments are arranged in layers, each layer including a plurality of compartments.

3. A filter according to claim 1, wherein the supporting member comprises a central supporting tube, the compartments are disposed around the central supporting tube, and the backwash means is rotatably disposed axially within the tube, each compartment communicating with the tube for normal flow and with the rotating backwash duct pipe for reverse flow backwash.

4. A filter according to claim 1, wherein the filter compartments have a first, top, and a second, bottom, membrane of suitable aperture to retain the fine filter media in compartments.

5. A filter according to claim 1 wherein the filter includes means for providing an additional, secondary, flow of clean water between the particulate filter media and the first membrane to provide improved backwashing for the first screen without appreciably disturbing the particulate filter material.

6. A filter according to claim 5 wherein the secondary backwashing flow is provided from an external source controlled in synchronism with the backwash means.

7. A filter according to claim 5, wherein the inlet for said secondary backwashing flow includes a deflector for directing the flow towards the first membrane.

8. A filter according to claim 5, wherein the compartments are disposed around a central supporting tube, the backwash means is rotatably disposed axially within the tube, a distribution means having a flow path therethrough is secured to the backwash means such that rotation of the backwash means to backwash the media in a compartment also aligns said flowpath for secondary backwashing fluid with a duct leading to an entry to said compartment positioned between the first and second screens.

9. A filter comprising a hollow supporting member, a plurality of comparments supported exteriorly of the supporting member and including fine particulate filter media for providing a very fine filtration of fluid passing through said compartments, first and second membranes in each compartment for confining the particulate filter media therein, first backwash means rotatably disposed axially within the supporting member and having at least one duct arranged to register with apertures in the supporting member leading to the filter compartments, means for bringing the duct into registration with the apertures to permit backwashing of the filter media in the compartments, said first membranes comprising means for restricting any appreciable deterioration of the filter media during backwashing of the respective compartments, and second backwash means for selectively introducing a secondary backwash flow between the first and second membranes of a compartment in synchronism with the backwashing of said compartment by the first backwash means.

* * * * *